United States Patent [19]

Shishkin et al.

[11] Patent Number: 4,944,353

[45] Date of Patent: * Jul. 31, 1990

[54] AGRICULTURAL MACHINE

[75] Inventors: Viktor V. Shishkin; Nikolai F. Kryazhevskikh; Jury P. Shapovalov, all of Krasnodar, U.S.S.R.

[73] Assignee: Trest "Juzhvodoprovod", Drasnodar, U.S.S.R.

[*] Notice: The portion of the term of this patent subsequent to Jan. 31, 2006 has been disclaimed.

[21] Appl. No.: 110,716

[22] PCT Filed: Dec. 17, 1986

[86] PCT No.: PCT/SU86/00131

§ 371 Date: Jul. 16, 1987

§ 102(e) Date: Jul. 16, 1987

[87] PCT Pub. No.: WO87/03775

PCT Pub. Date: Jul. 2, 1987

[30] Foreign Application Priority Data

Dec. 24, 1985 [SU] U.S.S.R. ............... 3988675
Dec. 24, 1985 [SU] U.S.S.R. ............... 3988674

[51] Int. Cl.⁵ .................. A01B 51/00; B25J 11/00; B62D 57/00
[52] U.S. Cl. .................. 172/23; 172/292; 111/200; 901/21; 280/28.5; 305/34
[58] Field of Search ............... 111/1, 52, 34, 85; 172/292, 23; 47/17, 19, 28.1, 29, 65; 280/28.5; 198/812, 861.1; 305/34; 604/271; 901/21, 22; 446/220, 183, 198

[56] References Cited

U.S. PATENT DOCUMENTS

| 3,178,732 | 4/1965 | Stibitz | 305/34 |
| 3,753,409 | 8/1973 | Frazier | 111/DIG. 1 |
| 3,757,788 | 9/1973 | Renfroe | 604/271 |
| 4,577,436 | 3/1986 | Dalle | 47/17 |

FOREIGN PATENT DOCUMENTS

| 697315 | 11/1979 | U.S.S.R. | 901/22 |
| 1202863 | 1/1986 | U.S.S.R. | 901/22 |

Primary Examiner—Danton D. DeMille
Attorney, Agent, or Firm—Burgess, Ryan and Wayne

[57] ABSTRACT

An agricultural machine comprises a self-propelled chassis (1) and an arrangement for displacement of the working member (9) over the field surface, comprising a hermetic chamber (3) with a port (4), a source (2) of a fluid agent pumped into the chamber (3) under a pressure, and a flexible hose (7) wound onto a drum (5) and internally accommodating a tractive element (8). A section of the tractive element (8) projecting from a free end of the hose (7) mounts an attachment carrying the working member (9) and movably connected with the flexible hose (7). The free end of the hose (7) is passed through the chamber (3), turned inside out and hermetically secured in the port (4) of the chamber (3) so that it forms an annular space (A) communicating with the chamber (3) and by changing its volume under the action of the fluid agent moves the hose (7) over the field, which pushes in front of itself the attachment carrying the working member (9).

7 Claims, 2 Drawing Sheets

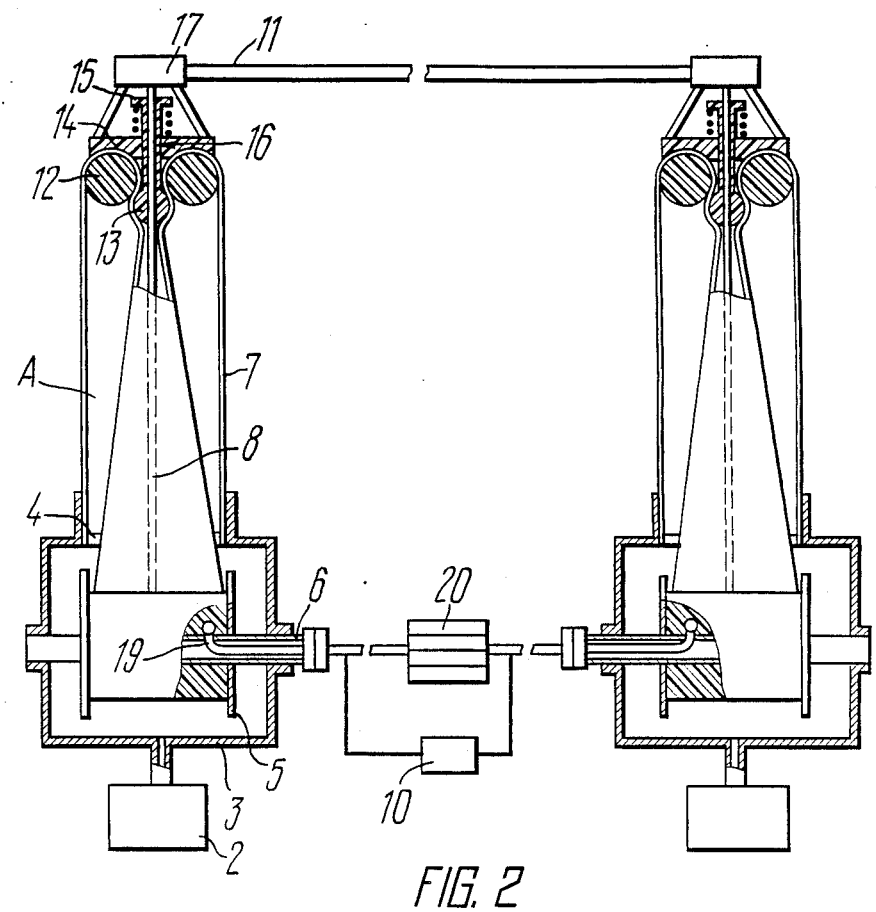

1

AGRICULTURAL MACHINE

TECHNICAL FIELD

The present invention relates to the agricultural machinery industry and more particularly to agricultural machines for various agricultural operations in the field: soil cultivation, sowing, crop cultivation and harvesting.

It is most advantageous to use the given type of machines on wetted and overwetted soils where the implements with an increased tractive force are needed.

PRIOR ART

At present different agricultural machines are used for cultivation of soil, sowing, crop cultivation and harvesting, comprising a self-propelled chassis, an attachment carrying a working member for performing agricultural operations in the field and means for controlling the working member.

A disadvantage of all the above-mentioned machines resides in an excessive compaction of soil resulting in disturbing the structure thereof which afterwards has an adverse effect on the crop yield.

Known to the prior art is, for example, an arrangement for placement of a fluid material in the soil, comprising a sowing apparatus, a propelling device for the sowing apparatus, a hopper for a fluid seed material and a delivery system connected by a pipeline with an air chamber (cf., for example, USSR Inventor's Certificate No. 257,899, cl. A01C 15/04, 1968). Such an arrangement is ganged up with a heavy tractor which involves a substantial compaction of soil.

Besides the arrangement does not possess a sufficient capacity for performing the above-mentioned agricultural operations.

Also known to the prior art is an arrangement for cropping, comprising a hopper for a seed material, a drive drum secured on a body, an elastic perforated element, a sowing apparatus and a harvesting mechanism (cf. USSR Inventor's Certificate No. 803,885, Int. cl. A01 C 7/00, 1979).

The given arrangement is also moved over a cultivated area by a propelling device based on a tractor and also suffers from the same disadvantages. Besides this arrangement has limited engineering capabilities because of a low tractive force developed by the propelling device. The use of the given arrangement is limited by a gradient of the crop area and a degree of soil preparation.

Also known in the prior art is an agricultural machine for sowing loose materials, comprising a self-propelled chassis, an attachment carrying the sowing apparatus and means for controlling the same (cf. USSR Inventor's Certificate No. 908,262, IPC A01 07/08, 1979).

The machine is ganged up with a self-propelled chassis and moved on the field sowing the required material. When the entire machine-and-self-propelled chassis assembly is moved on the field the soil is over-compacted under the action of the entire mass of the machine-and-self-propelled chassis assembly and the seed material contained therein, and the consumption of power by the moved machine is increasesd.

The machine cannot be used on wet soils, as its movement on the field becomes impossible. The operator is always in the zone of the working member operation which has an adverse effect on his fitness to work. A low tractive force does not allow the operating width to be increased for respective agricultural operations which extends the terms of the farm work completion.

It is an object of the present invention to eliminate the above-mentioned disadvantages of the arrangements heretofore described.

BRIEF DESCRIPTION OF THE INVENTION

It is the principal object of the invention to provide, in an agricultural machine, an arraangement for displacement of the working member over the surface of a field with the view to reduce the specific ground pressure, as well as to increase the tractive force on a working member.

This object is achieved by that an agricultural machine comprising a self-propelled chassis, an attachment carrying a working member with a rod for performing agricultural operations in the field and means for controlling the working member, according to the invention, is provided with an arrangement for displacement of the working member over the field surface, comprising a hermetic chamber with a port, a source of a fluid agent pumped in the chamber under a pressure, and a flexible hose wound on a drum and internally accommodating a tractive element a section of which projecting from a free end of the hose mounts an attachment carrying the working member and movably connected with the flexible hose, while the free end of the hose is passed through the chamber, turned inside out and hermetically secured in the port of the chamber so that it forms an annular space communicating with the latter and by changing its volume under the action of the fluid agent moves the hose over the field and the latter pushes in front of itself the attachment carrying the working member.

Such a design of the agricultural machine makes it possible to substantially reduce its mass and consequently to minimize the compaction of soil, as well as to increase the tractive force at the output to provide a good going of the working member.

For widening the engineering capabilities, the drum may suitably be installed on an axle for reverse rotation.

For convenience in operation, the hermetic chamber, the source of a fluid agent and the drum may advantageously be disposed on a self-propelled chassis.

To ensure rotation of the working member, the ends of the tractive element should be connected with the hose.

One of the embodiments provides the attachment carrying the working member in the form of a rod installed between the hose and the tractive element.

Such an embodiment of the attachment simplifies the construction as a whole and also makes it possible to increase the tractive force applied to the working member.

Another embodiment of the attachment carrying the working member comprises a toroidal part disposed in the annular space of the hose section turned inside out, a spherical body whose diameter is greater than the hole of the toroidal part, disposed directly in the hose upstream of said toroidal part, and a supporting element connected with the spherical body through the medium of a spring-loaded stem and carrying a bracket for securing the rod of the working member, the tractive element being passed through a duct made in the spherical body.

Such an embodiment of the attachment makes it possible to use, in a machine, any working member irrespective of the tractive forces required for accomplishment of agricultural operations in the field, and also to increase the pushing force applied to the working member.

It is desirable that the agricultural machine be provided with one more arrangement for displacement of the working member made similarly to the first one and disposed parallel thereto, and the attachments carrying the working member should be interconnected by a coupling bar made up of the rods fastened to each other.

This makes it possible to control the movement of the arrangement for displacing the working member and to increase the operating width of the working member for performance of agricultural operations.

Still another embodiment provides additional hoses internally accomodated in the hose and intended for delivery of constituents to the working member for performance of agricultural opaerations in the field, communicated with reservoirs installed on a self-propelled chassis and passed through the duct of the spherical body.

Such an embodiment enables the operator to control operation of the working member from the self-propelled chassis at different points of a cultivated field and also to widen the range of used constituents.

Thus, it may be noted that the given machine in the proposed design embodiment makes it possible to dispense with the universally accepted schemes in the accomplishment or different agricultural operations and to use the unique arrangement of a simplified design for displacement of the working member.

SUMMARY OF THE DRAWINGS

The invention will now be described in greater detail with reference to specific embodiments thereof, taken in conjunction with the accompanying drawings, wherein:

FIG. 2 illustrates a plan view of an aggrangement for displacement of a working member and an embodiment of an attachment carrying the working member;

PREFERRED EMBODIMENT OF THE INVENTION

Figure 1:
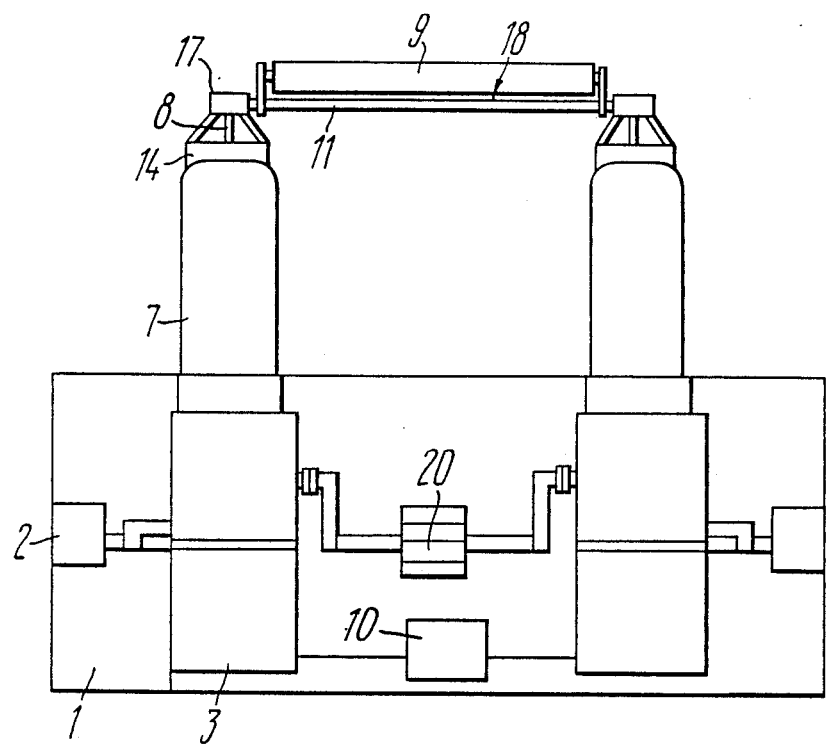
FIG. 1 diagrammatically illustrates a plan view of the agricultural machine.

An agricultural machine (FIGS. 1, 2) comprises a self-propelled chassis 1 on the base of which are mounted a source 2 of a fluid agent, for example, a gas-air mixture, a hermetic chamber 3 with a port 4 in which the gas is pumped under a pressure, a drum 5 installed on a hollow shaft 6 kinematically associated with an engine (not shown in the drawing) of the self-propelled chassis 1. A flexible hose 7 internally accommodating a tractive element 8 is wound on the drum 5. The ends of the hose 7 are connected with the tractive element 8. The drum 5 may be installed inside or outside the chamber 3, and a free end of the hose 7 should be passed through the chamber 3, turned inside out and hermetically secured in the chamber port 4. The hose 7 turned inside out forms an annular space A communicating with the chamber 3 and all the time changing its volume in the process of the hose unwinding from the drum 5. The drum 5 is installed on the shaft 6 for reverse rotation. One of the sections of the tractive element 8 projects from the free end of the hose 7 and cooperates with the attachment disposed thereon and carrying a working member 9 for performance of agricultural operations in the field. The attachment is movably connected with the hose 7. The self-propelled chassis 1 mounts means 10 for controlling the working member 9.

The hermetic chamber 3, the source 2 of a fluid agent and also the drum 5 with the flexible hose 7 wound thereon present in combination the arrangement for displacement of the attachment carrying the working member 9.

Figure 3:
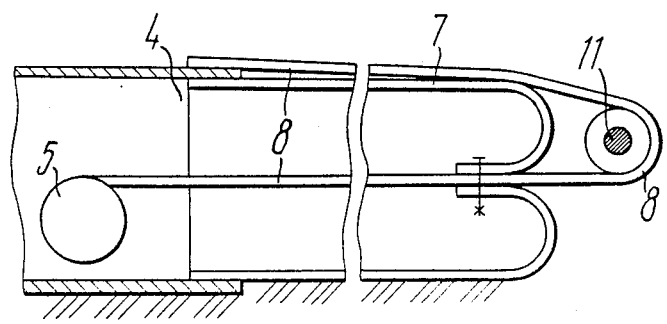
FIG. 3 illustrates a side view cutaway another embodiment of the attachment carrying the working member.

The most simple embodiment of the attachment carrying the working member 9 is illustrated in FIG. 3. It comprises a rod 11 installed between the hose 7 and the tractive element 8.

Another embodiment of the attachment carrying the working member 9 is illustrated in FIG. 2. The attachment comprises a toroidal part 12 disposed in the annular space A of the section of the hose 7 turned inside out, a spherical body 13 whose diameter is greater than a hole of the toroidal part 12, disosed directly in the hose 7 upstream of the toroidal part 12, and a supporting element 14 disposed outside the hose 7 and connected with the spherical body 13 through the medium of a spring-loaded hollow stem 15. A duct 16 is made in the spherical body 13. A bracket 17 for securing the rod 11 of the working member 9 is mounted on the supporting element 14. The duct 16 and the hollow stem 15 are designed for passing the tractive element 8 enveloping the rods 11 (FIG. 3) and secured on the hose 7.

For increasing the operating width of the working member for accomplishment of agricultural operations in the field and for changing the direction of its movement the machine is provided with a second arrangement for displacement of the working member made similarly to the first one and disposed parallel thereto. In this case the rods 11 are fastened to each other and make up a coupling bar 18. Additional hoses 19 are internally accommodated in the hose 7 and intended for delivery of constituents to the working member 9, and communicated with reservoirs 20 installed on the self-propelled chassis 1. The additional hoses 19 are passed through the duct 16 of the spherical body 13 and the hollow stem 15.

The agricultural machine operates in the following way.

The operator drives the self-propelled chassis to the field. Depending on an agricultural operation to be accomplished, the operator secures the required working member 9 on the rod 11. Then he cuts in the source 2 of a fluid agent which enters the hermetic chambers 3 and the hoses 7 and unwinds the latter from the drum 5. Moving over the field surface the hose 7 pushes in front of itself the attachment carrying the working member 9. The direction of movement of the working member 9 on the field is changed by way of increasing or decreasing the volume of the annular space A of one of the hoses 7. When the working member is moved over the field, different commands are fed into the actuating mechanisms of the working member 9 through the control means 10 laid inside the hoses.

When performing operations requiring a unidirectional movement of the working member, for example, soil levelling, straw raking, snow retention, it is preferred to use an attachment carrying the working member in the form of the rod 11 installed between the hose 7 and the tractive element 8. In this case the hose while unwinding from the drum 5 displaces the working member 9 at no-load to the working position and then after going into reverse the drum 5 starts winding the hose 7 thereby moving towards itself the working member 9 which does the useful work. In this case the fluid agent is forced out of the annular spaces A and is returned to the source 2 or discharged into the atmosphere. When performing operations which require the forces for displacement of the working member on both sides of the cultivated field, the use is made of an attachment carrying the working member, comprising the toroidal part 12 the spherical body 13 and the supporting element 14. The fluid agent acting on the toroidal part 12 turns the hose 7 inside out and the latter pushes the supporting element 14 which displaces the working member 9. The reverse movement of the working member is accomplished as was described hereinabove.

It should be mentioned that the tractive element 8 is capable of developing a torque in addition to the tractive force.

In this case the use is made, for example, of a known chain drive.

In the process of operation different constituents required for agricultural operations, for example, water for sprinkling, seeds for sowing, fertilizers for dressing, etc. are delivered by a known method from the reservoirs 20 through the additional hoses 19 to the working member 9.

INDUSTRIAL APPLICABILITY

The present invention may be effectively used both in the agriculture and various industries, for example, for displacement of different loads, for conveying the rock in the mining industry, for delivery of different means over water obstacles and adverse terrain, for loading and unloading of ships when equipped wharves are lacking.

We claim:

1. An agricultural machine comprising a self-propelled chassis (1), an attachment carrying a working member (9) with a rod (11) for performing agricultural operations in the field and means (10) for controlling the working member characterized in that the agricultural machine is provided with an arrangement for displacement of the working member (9) over the field surface, comprising a hermetic chamber (3) with a port (4), a source (2) of a fluid agent pumped into the chamber (3) under a pressure, and a first end of a flexible hose (7) wound on a drum (5) and internally accomodating a tractive element (8) on a section of which the tractive element (8) which projects projecting from a free end of the flexible hose (7) mounts is mounted the an attachment carrying the working member (9) and said tractive element (8) is movably connected with the flexible hose (7), while the free a second end of the hose (7) is passed through the chamber (3), turned inside out and hermetically secured in the port (4) of the chamber (3) so that it hose (7) forms an annular space (A) communicating with the latter chamber (3) and by changing its volume under the action of the fluid agent moves the hose (7) over the field and the latter hose (7) pushes in front of itself the attachment carrying the working member (9)

2. An agricultural machine according to claim 1, wherein the drum (5) is installed on a shaft (6) for reverse rotation.

3. An agricultural machine accordign to claim 1, wherein the hermetic chamber (3), the source (2) of a fluid agent and the drum (5) are disposed on the self-propelled chassis (1).

4. An agricultural machine according to claim 1, wherein the attachment carrying the working member (9) is made in the form of a rod (11) installed between the hose (7) and the tractive element (8).

5. An agricultural machine according to claims 1, 2, or 3 wherein the attachment carrying the working member (9) comprises a toroidal part (12) disposed in the annular space (A) of the hose (7) section turned inside out, a spherical body (13) whose diameter is greater than a hole of the toroidal part (12), disposed directly in the hose (7) upstream of said toroidal part (12), and a supporting element (14) connected with the spherical body (13) through the meduim of a spring-loaded stem (15) and carrying a bracket (17) for securing the rod (11) of the working member (9) the tractive element (8) being passed through a duct (16) made in the spherical body (13).

6. An agricultural machine according to claim 1, or 4, wherein the agricultural machine is provided with a second arrangement for displacement for displacement of the working member (9) made according to the first arrangement and disposed parallel thereto, and the attachments carrying the working member (9) are interconnected by a coupling bar (18) made up of the rods (11) fastened to each other.

7. An agricultural machine according to claim 5, wherein additional hoses (19) are internally accommodated in the hose (7) and intended for delivery of constituents to the working member (9) for performing agricultural operations in the field, the additional hoses being in communication with reservoir (20) installed on the self-propelled chassis (1) and passed through the duct (16) of the spherical body (13).

* * * * *